(12) United States Patent
Wardlaw et al.

(10) Patent No.: US 8,045,165 B2
(45) Date of Patent: Oct. 25, 2011

(54) METHOD AND APPARATUS FOR DETERMINING A FOCAL POSITION OF AN IMAGING DEVICE ADAPTED TO IMAGE A BIOLOGIC SAMPLE

(75) Inventors: Stephen C. Wardlaw, Lyme, CT (US); Niten V. Lalpuria, Hamden, CT (US); Darryn W. Unfricht, North Haven, CT (US)

(73) Assignee: Abbott Point of Care, Inc., Princeton, NJ (US)

( * ) Notice: Subject to any disclaimer, the term of this patent is extended or adjusted under 35 U.S.C. 154(b) by 326 days.

(21) Appl. No.: 12/408,479

(22) Filed: Mar. 20, 2009

(65) Prior Publication Data

US 2009/0237665 A1 Sep. 24, 2009

Related U.S. Application Data

(60) Provisional application No. 61/038,572, filed on Mar. 21, 2008.

(51) Int. Cl.
*G01N 21/00* (2006.01)
(52) U.S. Cl. ........................................ 356/432; 356/433
(58) Field of Classification Search .......... 356/432–433, 356/244, 246, 440–442; 436/63, 800, 165, 436/805, 807, 66, 808, 809, 8, 10; 422/50, 422/73, 68.1, 82.05, 63, 67, 82.09, 119, 72; 435/2, 960, 40.5; 382/128
See application file for complete search history.

(56) References Cited

U.S. PATENT DOCUMENTS

| | | | |
|---|---|---|---|
| 4,023,716 A | 5/1977 | Shapiro | |
| 4,197,088 A | 4/1980 | Meserol et al. | |
| 4,487,081 A | 12/1984 | De Vaughn et al. | |
| 4,615,878 A | 10/1986 | Kass | |
| 5,012,818 A | 5/1991 | Joishy | |
| 5,068,181 A | 11/1991 | Driscoll | |

(Continued)

FOREIGN PATENT DOCUMENTS

DE 10011235 9/2001

(Continued)

OTHER PUBLICATIONS

Sun et al, "Microminiaturized immunoassays using quantum dots as fluorescent label by laser confocal scanning fluorescence detection," Journal of Immunological Methods, Elsevier Science Publishers, vol. 249, No. 1-2, pp. 85-89, Mar. 2001.

(Continued)

*Primary Examiner* — Tri T Ton
(74) *Attorney, Agent, or Firm* — O'Shea Getz P.C.

(57) ABSTRACT

A method and apparatus for focusing a device for imaging a biologic sample is provided. A method aspect of the disclosure includes the steps of: 1) disposing lenslets within a field of a biologic sample, which lenslets have a height, and have a refractive index and which refractive index is different from that of the sample, wherein one or both of the imaging device and the sample are relatively locatable so a focal position of the imaging device can be moved along the height of the lenslets; 2) imaging at least a portion of the sample including a plurality of lenslets using transmittance at one or more predetermined wavelengths; 3) determining an average light transmittance intensity of the sample at the wavelengths; 4) determining an average light transmittance intensity of a region of each lenslet at the wavelengths; and 5) determining the focal position of the imaging device using the average light transmittance intensity of the sample and the average light transmittance intensity of the region of the lenslets.

28 Claims, 6 Drawing Sheets

U.S. PATENT DOCUMENTS

| | | | |
|---|---|---|---|
| 5,192,511 A | 3/1993 | Roach | |
| 5,284,771 A | 2/1994 | Fan et al. | |
| 5,447,838 A | 9/1995 | Meiklejohn et al. | |
| 5,454,268 A | 10/1995 | Kim | |
| 5,460,782 A | 10/1995 | Coleman et al. | |
| 5,739,042 A | 4/1998 | Frengen | |
| 5,768,407 A | 6/1998 | Shen et al. | |
| 5,770,160 A | 6/1998 | Smith et al. | |
| 6,127,184 A | 10/2000 | Wardlaw | |
| 6,235,536 B1 | 5/2001 | Wardlaw | |
| 6,723,290 B1 | 4/2004 | Wardlaw | |
| 6,730,521 B1 | 5/2004 | Cassells | |
| 6,866,823 B2 | 3/2005 | Wardlaw | |
| 2002/0028158 A1 | 3/2002 | Wardlaw | |
| 2002/0131902 A1 | 9/2002 | Levy | |
| 2003/0025896 A1 | 2/2003 | Oever et al. | |
| 2003/0224534 A1 | 12/2003 | Kawate | |
| 2004/0048330 A1 | 3/2004 | Bittner | |
| 2004/0165090 A1 | 8/2004 | Ning | |
| 2005/0002826 A1 | 1/2005 | Oguni et al. | |
| 2005/0026197 A1 | 2/2005 | Dertinger | |
| 2005/0277159 A1 | 12/2005 | Lehmann et al. | |
| 2006/0159962 A1 | 7/2006 | Chandler et al. | |
| 2006/0258018 A1 | 11/2006 | Curl et al. | |
| 2007/0087442 A1 | 4/2007 | Wardlaw | |
| 2007/0243117 A1 | 10/2007 | Wardlaw | |
| 2008/0070317 A1 | 3/2008 | Bradshaw et al. | |

FOREIGN PATENT DOCUMENTS

| | | | |
|---|---|---|---|
| DE | 10240742 | 3/2004 | |
| EP | 0366151 | 5/1990 | ............ 33/543 |
| EP | 0642829 | 3/1995 | |
| EP | 1239284 | 9/2002 | ............ 33/53 |
| GB | 2254414 | 10/1992 | ............ 21/84 |
| WO | WO 9802727 | 1/1998 | ............ 15/14 |
| WO | WO 0057891 | 5/2000 | |
| WO | WO 0223154 | 3/2002 | ............ 33/558 |

OTHER PUBLICATIONS

Goldman et al., "Multiplexed Toxin Analysis using Four Colors of Quantum Dot Fluororeagents," Analytical Chemistry, American Chemical Society, vol. 76, No. 3, pp. 684-688, Feb. 2004.

Matzdorff et al., "Quantitative assessment of platelets, platelet microparticles, and platelet aggregates in flow cytometry," The Journal of Laboratory and Clinical Medicine, vol. 131, No. 6, pp. 507-517, Jun. 1998.

Hu Hu et al, "Effects of insulin on platelet and leukocyte activity in whole blood," Thrombosis Research, vol. 107, No. 5, pp. 209-215, Sep. 2002.

Sbrana et al., "Relationships between optical aggregometry (type born) and flow cytometry in evaluating ADP-induced platelet activation," Cytometry, Part B, Clinical Cytometry, vol. 74, No. 1, pp. 30-39, Jan. 2008.

METHOD AND APPARATUS FOR DETERMINING A FOCAL POSITION OF AN IMAGING DEVICE ADAPTED TO IMAGE A BIOLOGIC SAMPLE

The present application is entitled to the benefit of and incorporates by reference essential subject matter disclosed in U.S. Provisional Patent Application Ser. No. 61/038,572, filed Mar. 21, 2008.

BACKGROUND OF THE INVENTION

1. Technical Field

The present invention relates to imaging biologic samples in general, and to focusing the image of biologic samples in particular.

2. Background Information

Automated microscopy systems that take multiple images over the surface of a biologic sample generally require the imaging system to be re-focused for each field imaged. Refocusing is necessary because the required precision of focus for such systems, at useful magnifications, can be as little as one micron and it is virtually impossible to hold the mechanical tolerances of the sample holder to these dimensions. To completely image even a small biologic sample quiescently residing within an analysis chamber such as that disclosed in U.S. Pat. No. 6,723,290, entitled "Container for Holding Biologic Fluid for Analysis", it is necessary to take over a hundred individual images, and to perform this operation in a reasonable time, it is necessary to re-focus each image field as rapidly as possible.

Conventional automatic focusing techniques typically use characteristics of the image itself to acquire the proper focus, or may use a device that is independent of the image capture device, such as an interferometer or the like to measure and maintain a set distance between the objective lens and the subject. In the first case, it is typically necessary to take several image capture cycles with the image capture device to calculate the best point of focus. This multiple image process is time consuming and therefore not desirable. In the second case, the independent device typically adds complication and considerable expense to the imaging system. The present invention, in contrast, provides an inexpensive means of ensuring rapid focusing that is consistently accurate, one that can be used in a variety of imaging system configurations, and one that relies only on the imaging system itself.

SUMMARY OF THE INVENTION

According to the present invention, a method and apparatus for focusing an imaging device is provided, which imaging device is adapted to image a biologic sample, which sample has a refractive index.

According to an aspect of the present invention, a method for focusing an imaging device is provided, comprising the steps of: 1) disposing lenslets within a field of a biologic sample, which lenslets have a height, and have a refractive index and which refractive index is different from that of the sample; 2) wherein one or both of the imaging device and the sample are relatively locatable so a focal position of the imaging device can be moved along the height of the lenslets; 3) imaging at least a portion of the sample including a plurality of lenslets using transmittance at one or more predetermined wavelengths; 4) determining an average light transmittance intensity of the sample at the wavelengths; 5) determining an average light transmittance intensity of a region of each lenslet at the wavelengths; and 6) determining the focal position of the imaging device using the average light transmittance intensity of the sample and the average light transmittance intensity of the region of the lenslets.

According to another aspect of the present invention, an apparatus for imaging a biologic sample is provided. The apparatus includes a chamber, a plurality of lenslets, a field illuminator, an image dissector, a positioner, and a programmable analyzer. The chamber is formed between a first panel and a second panel, which panels are transparent. The chamber is operable to quiescently hold the sample. The plurality of lenslets is disposed within the chamber. Each lenslet has a height and a refractive index, which refractive index is different from that of the sample. The field illuminator is operable to selectively illuminate at least a field of the sample. The image dissector is operable to convene an image of light passing through the field of the sample and lenslets into an electronic data format. The positioner is operable to selectively change the relative position of one or more of the chamber containing the lenslets, the field illuminator, and the image dissector to selectively change a focal position of the apparatus along the height of the lenslets. The programmable analyzer is adapted to cooperate with the field illuminator and the image dissector to image at least the field of the sample and a plurality of the lenslets using transmittance at one or more predetermined wavelengths. The analyzer is further adapted to: 1) determine a representative light transmittance intensity of the sample field at the wavelengths; 2) determine a representative light transmittance intensity of at least one region of the lenslets at the wavelengths; and 3) determine the focal position of the apparatus using the representative light transmittance intensity of the sample field and the representative light transmittance intensity of the region of the lenslets.

The present method and apparatus present numerous advantages over currently available biologic sample imaging and analysis technology. For example, the present invention provides an inexpensive means of ensuring rapid focusing of a biologic sample that is consistently accurate, one that can be used in a variety of imaging system configurations, and one that relies only on the imaging system itself. The present invention also can typically determine from a single image whether or not the imaging system is in perfect exposure, and if not, the present invention can often determine the exact amount of movement required to bring sample image into perfect focus. The present invention also provides an imaging method and apparatus that is insensitive to the actual exposure or image light intensity, and thereby provides a more robust method and apparatus.

The present method and advantages associated therewith will become more readily apparent in view of the detailed description provided below, including the accompanying drawings.

DETAILED DESCRIPTION OF EMBODIMENTS OF THE INVENTION

Figure 1:
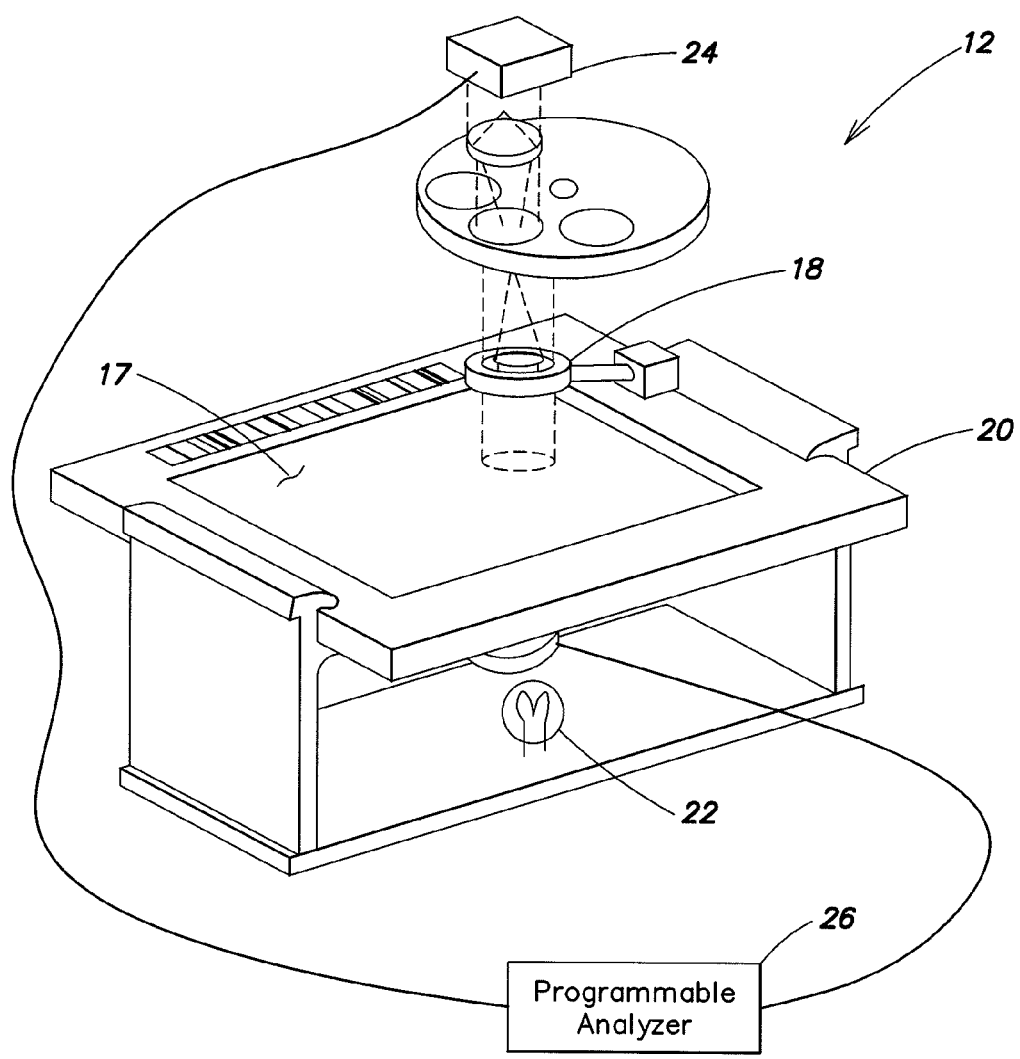
FIG. 1 is a diagrammatic schematic of an analysis device that may be used with the present method.

Now referring to FIGS. 1-5, the present invention provides a method and apparatus for focusing an analytical device, which device is operable to image a biologic sample. The analytical device is referred to hereinafter as an "imaging device". The invention can be used to focus imaging devices operable to analyze a variety of different biologic sample types, including liquid samples, tissue samples, smears, etc. The present invention is particularly useful for, but is not limited to, focusing imaging devices operable to analyze liquid biologic samples; e.g., substantially undiluted samples of anticoagulated whole blood. The term "substantially undiluted" as used herein describes a sample which is either not diluted at all or has not been diluted purposefully, but has had some reagents added thereto for purposes of the analysis; e.g., anticoagulants, colorants, etc.

Because the properties of images of biologic samples, such as whole blood, are quite variable, there is no single metric which can be applied to a single image which can determine whether the imaging device is in focus. To overcome this issue, existing imaging devices typically utilize an iterative focusing process that requires multiple images (at least two, and often times many more) to determine the best focal position relative to the sample; e.g., the device will search for a focus depth which provides the highest contrast, the sharpest edges or the like. The present invention, in contrast, can determine from a single image whether or not the imaging system is in perfect exposure, and if not, the present invention can often determine the exact amount of movement required to bring sample image into perfect focus.

According to an aspect of the present invention, the method includes the steps of: 1) positioning lenslets 10 relative to a field of a biologic sample 11, wherein one or both of the imaging device 12 and the sample 11 are relatively locatable so that a focal position of the imaging device 12 can be moved along the height 14 of the lenslets 10; 2) imaging at least a portion of the biologic sample 11 containing a plurality of the lenslets 10 using transmittance at one or more predetermined wavelengths; 3) determining an average light transmittance intensity of the sample 11 at the wavelengths; 4) determining an average light transmittance intensity of a region of the lenslets 10 at the wavelengths; and 5) determining the focal position of the imaging device 12 using the average light transmittance intensity of the sample 11 and the average light transmittance intensity of the region of the lenslets 10.

The lenslets 10 have a height 14, a refractive index, a regular shape, and a characteristic light transmittance pattern. The height 14 of the lenslets 10 is parallel to the axis along which the focal position is adjusted; e.g., typically referred to as the "Z" axis of an imaging device 12. The refractive index of the lenslets 10 is different from the refractive index of the sample 11. Each of the lenslets 10 has the same regular shape, which shape is typically symmetrical (e.g., spherical).

The characteristic light transmittance pattern of a lenslet 10 is a function of several factors, including the refractive index of that lenslet 10. Lenslets 10 act to bend the light transmitted through the sample 11 away from the image path, and thus make at least some parts of the lenslets 10 appear darker than the background. The relative intensity of the light transmitted through each part of the lenslet 10 (i.e., the "light transmittance intensity") is also a function of the shape of the lenslet 10 and the focal position of the imaging device 12. If all of the lenslets 10 have a regular and preferably symmetrical shape, light transmittance intensity variability relating to the lenslet 10 geometry can be substantially eliminated, and the relationship between relative light transmittance intensity and focal position can be used to determine the exact point of focus of the imaging device 12.

Figure 6:
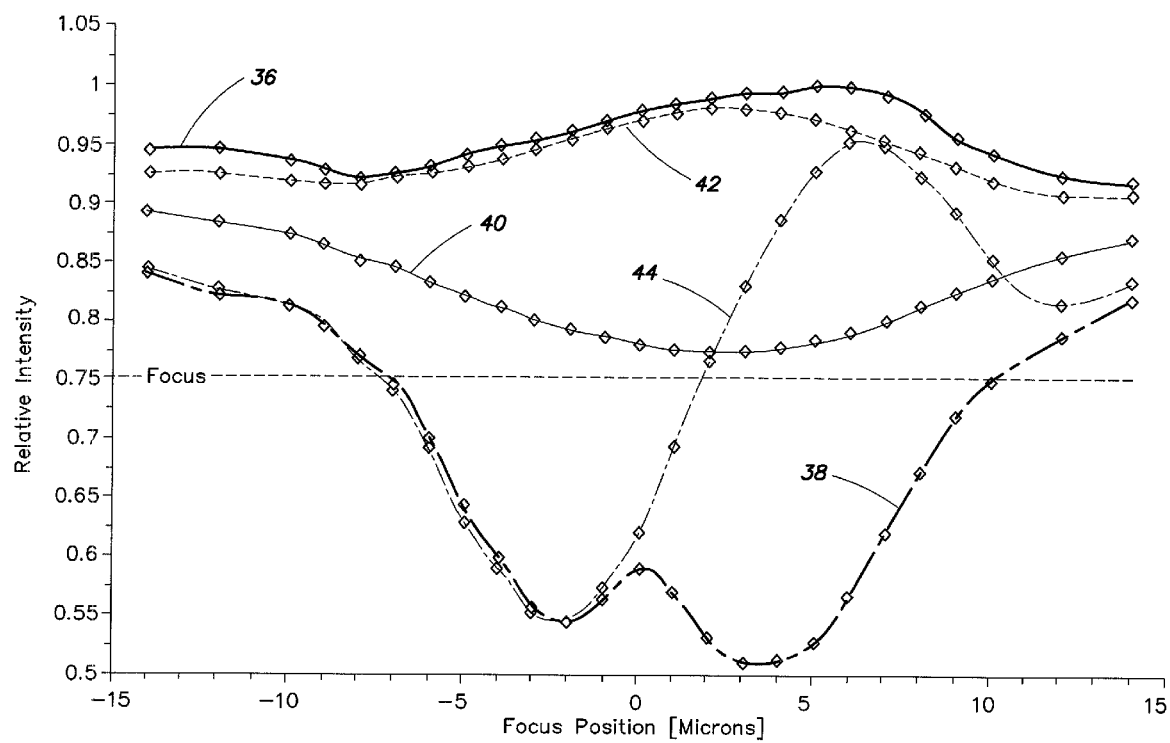
FIG. 6 is a graphical illustration of a lenslet light transmittance pattern.
Figure 7:
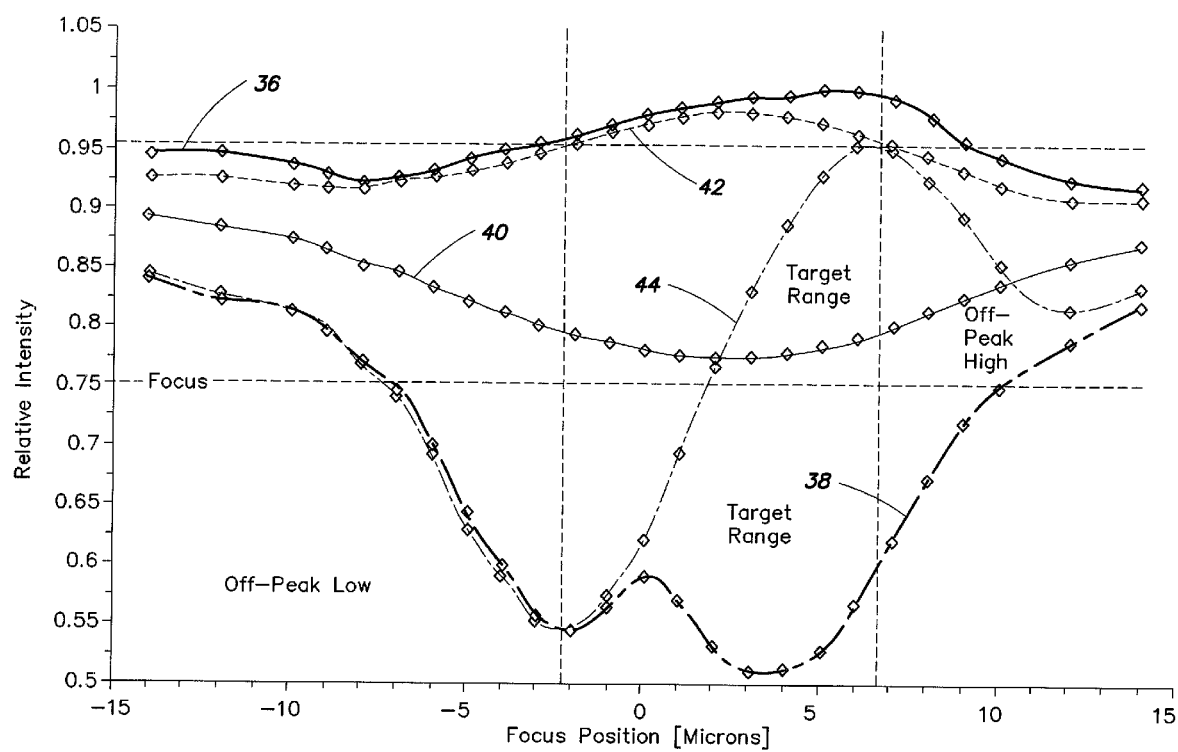
FIG. 7 is a graphical illustration of the lenslet light transmittance pattern, illustrating sections of the pattern.

The characteristic light transmittance pattern for a lenslet 10 is repeatable and consistent amongst lenslets 10 of the same type, and can be described for reference. The light transmittance pattern can be produced using one or more of a plurality of different wavelengths of light, provided the wavelengths of light are not appreciably absorbed by the lenslet 10. The light transmittance pattern can be described in terms of the relative light transmittance intensity through the lenslets 10 as a function of the focal position along the height 14 of the lenslets 10. The term "relative" is used to describe the light transmittance intensity of the different regions of the lenslet 10, relative to each other (e.g., center region vs. outer regions), and relative to the average light transmittance intensity of the sample 11 with which the lenslets 10 are disposed. FIGS. 6 and 7 show an example of a graphical representation of a characteristic light transmittance pattern. The graphical representation is an example of the pattern and the present invention is not limited to the same. The pattern can take the form of mathematical expressions describing the relative light transmittance curves, or could be in the form of a data table, etc.

An example of an acceptable type of lenslet 10 is a spherical bead that can be intimately mixed with the sample 11. As will be detailed below, spherical beads made from a polymeric material function well as lenslets 10 when mixed with a biologic fluid sample 11 (e.g., substantially undiluted, anticoagulated whole blood) that is disposed with a thin analysis chamber 17 through which investigating light can be transmitted. Such spheres can be made of polystyrene and are commercially available, for example, from Thermo Scientific of Fremont, Calif., U.S.A., catalogue no. 4204A, in four micron (4 µm) diameter. The lenslets 10 are not limited to a spherical shape, or any particular material or size, provided an amount of light can be transmitted there through which is sufficient for the present focusing process.

The imaging device 12 includes an objective lens 18, a chamber holding device 20, a sample illuminator 22, an image dissector 24, and a programmable analyzer 26. One or both of the objective lens 18 and chamber holding device 20 are movable toward and away from each other to change a relative focal position. The sample illuminator 22 is positioned to illuminate the sample 11 by transmitting light at one or more predetermined wavelengths through the sample 11. Light transmitted through the chamber 17 is captured by the image dissector 24 and processed into an image. The image is produced in a manner that permits the light transmittance intensity captured within the image to be determined on a per unit basis. The term "per unit basis" means an incremental unit of which the image of the sample 11 can be dissected; e.g., a "pixel" is generally defined as the smallest element of an image that can be individually processed within a particular imaging system. The present method is not, however, limited to use with any particular imaging device 12. In an alternative embodiment, the imaging device 12 could include a chamber associated with the device 12 that is intended to be used multiple times, as opposed to a disposable, independent chamber that is located within the imaging device 12 by a chamber holding device.

FIG. 1 illustrates an example of a biologic sample imaging device 12 that can be adapted for use with the present method, which device 12 includes a sample illuminator 22, an image dissector 24, and a programmable analyzer 26. The sample illuminator 22 includes a light source that selectively produces light along one or more wavelengths that are not appreciably absorbed by either the sample 11 or by lenslets 10 disposed within a chamber 17 quiescently holding the sample 11 to be tested. The imaging device 12 typically includes optics for manipulating the light (e.g., magnification, filtering, etc.). The sample illuminator 22 produces light along predetermined wavelengths (or along a spectrum of wavelengths which is subsequently limited to the predetermined wavelengths) that is transmitted through the sample 11. The light transmittance intensity of the lenslets 10 and the sample 11 are measured, for example, by positioning a light source on one side of the chamber 17, directing the light through the chamber 17, and thereafter capturing the light using the image dissector 24. An example of an acceptable image dissector 24 is a charge couple device (CCD) type image sensor that converts an image of the light passing through the sample 11 into an electronic data format. Complimentary metal oxide semiconductors ("CMOS") type image sensors are another example of an image sensor that can be used. The present invention is not limited to either of these examples. The programmable analyzer 26 includes a central processing unit (CPU) and is connected to the sample illuminator 22 and image dissector 24. The CPU is adapted (e.g., programmed) to selectively perform the functions necessary to perform the present method. It should be noted that the functionality of programmable analyzer 26 may be implemented using hardware, software, firmware, or a combination thereof. A person skilled in the art would be able to program the processing unit to perform the functionality described herein without undue experimentation. U.S. Pat. No. 6,866,823 entitled "Apparatus for Analyzing Biologic Fluids" issued Mar. 15, 2005, which is hereby incorporated by reference in its entirety, discloses such an imaging device 12.

An analysis chamber 17 that may be used within the analytical device is defined by a first panel 28 and a second panel 30, spaced apart from one another. The panels 28, 30 are both sufficiently transparent to allow the transmission of light along predetermined wavelengths there through in an amount sufficient to perform the analysis on the sample 11, including the focusing methodology described below. The present method can utilize a variety of different analysis chamber types having the aforesaid characteristics, and is not therefore limited to any particular type of analysis chamber 17.

Figure 2:
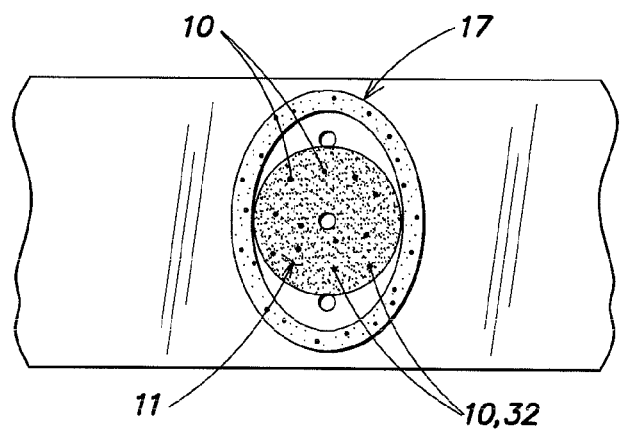
FIG. 2 is a diagrammatic planar view of an analysis chamber embodiment.
Figure 3:
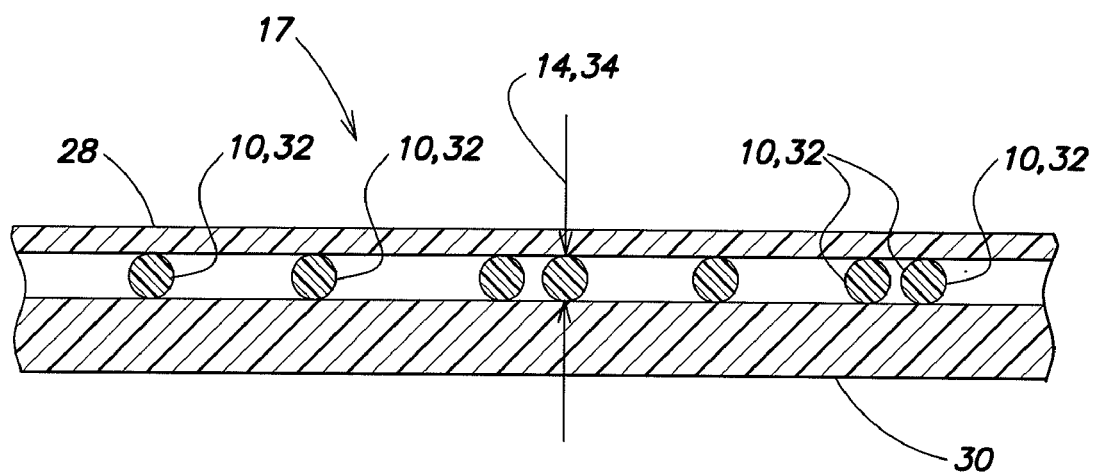
FIG. 3 is a diagrammatic cross-sectional view of an analysis chamber.

An example of an acceptable chamber 17 is shown in FIGS. 2 and 3, which chamber 17 includes a first panel 28, a second panel 30, and at least three separators 32 disposed between the panels 28, 30. The separators 32 space the panels 28, 30 apart from one another. The dimension of a separator 32 that extends between the panels is referred to herein as the height 34 of the separator 32. The heights 34 of the separators 32 typically do not equal one another exactly (e.g., manufacturing tolerances), but are within commercially acceptable tolerance for spacing means used in similar analysis apparatus. Spherical beads are an example of an acceptable separator 32. This example of an acceptable analysis chamber 17 is described in greater detail in U.S. Patent Application Publication Nos. 2007/0243117, 2007/0087442, and U.S. Provisional Patent Application Nos. 61/041,783, filed Apr. 2, 2008; and 61/110,341, filed Oct. 31, 2008, all of which are hereby incorporated by reference in their entirety.

In some embodiments, the separators 32 and the lenslets 10 are one in the same; i.e., the spherical beads have a size that is acceptable to separate the panels of the chamber 17, and have optical properties that make them acceptable as lenslets 10. It can be advantageous in some applications to have the spherical beads act as both separators 32 and as lenslets 10. Because the spheres act as a separator in those embodiments (e.g., in contact with or close proximity to the interior surfaces), it is unlikely that any appreciable amount of sample 11 material will be disposed between the sphere and either interior surface of the panels. The absence of any appreciable sample 11 material decreases or eliminates the possibility of sample material interfering with any light transmittance analysis of the spheres. There is no requirement, however, that either the separators 32 or lenslets 10 function as the other; e.g., separators 32 can be used independent of and along with lenslets 10.

Figure 4:
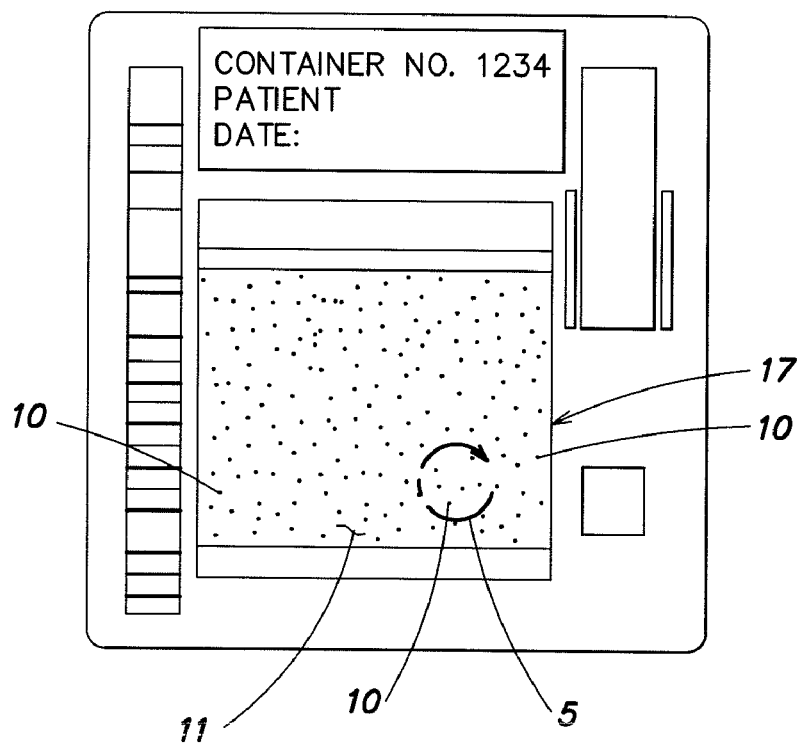
FIG. 4 is a diagrammatic planar view of an analysis chamber embodiment.

Another example of an acceptable chamber 17 is disposed in a disposable container as shown in FIG. 4. The chamber 17 is formed between a first panel and a second panel. Both the first panel and the second panel are transparent to allow light to pass through the chamber 17. This chamber 17 embodiment is described in greater detail in U.S. Pat. No. 6,723,290, which patent is hereby incorporated by reference in its entirety.

The analysis chambers 17 shown in FIGS. 2-4, represent chambers that are acceptable for use in the present method. In both instances, the chamber 17 is typically sized to hold about 0.2 to 1.0 µl of sample 11, but the chamber 17 is not limited to any particular volume capacity, and the capacity can vary to suit the analysis application. These chambers 17 are operable to hold a sample 11 quiescently within the chamber 17. The term "quiescent" is used to describe that the sample 11 is deposited within the chamber 17 for analysis, and is not purposefully moved during the analysis. To the extent that motion is present within the blood sample, it will predominantly be that due to Brownian motion of the blood sample's formed constituents, which motion is not disabling of the use of the device of this invention. The present method is not, however, limited to these particular chamber 17 embodiments.

Example

Figure 8:
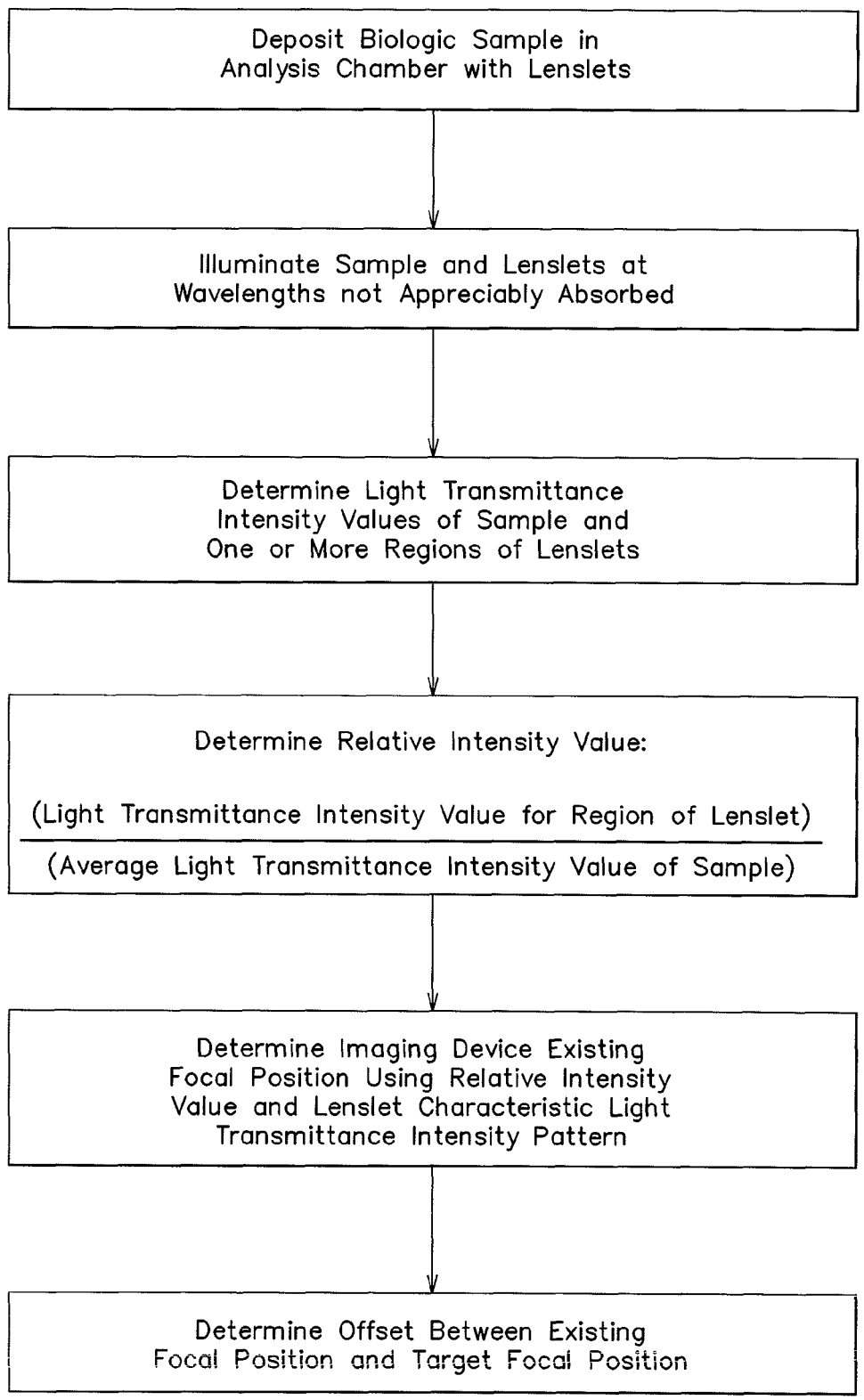
FIG. 8 is a block diagram providing steps of a method according to the present invention.

The following is an illustrative example of focusing an imaging device 12 according to the present method. FIG. 8 provides a block diagram according to a method aspect of the present invention. The invention is not, however, limited to this example.

A sample 11 of biologic fluid (e.g., substantially undiluted anticoagulated whole blood), is deposited within a chamber 17. A number of lenslets 10 are positioned relative to the sample 11 in a manner such that they will remain at a fixed distance from the point in the sample 11 where best focus is required for the duration of the analysis. The number of lenslets 10 can vary depending upon the application, but there should be enough such that there are a sufficient number of lenslets 10 in each field of view to accurately practice the method (e.g., a number of lenslets 10 great enough so that statistically acceptable average light transmittance intensity values can be calculated, etc.). The lenslets 10 may be dispersed randomly or in a pattern. The method is facilitated if the lenslets 10 are disposed within the focal plane of the sample 11, including being intimately disposed within the sample 11 itself, such as is the case in chamber 17 described above and shown in FIGS. 2-5. The method does not require the lenslets 10 being disposed within the sample focal plane, however. The focal plane for the lenslets 10 may be offset from the focal plane of the sample 11; e.g., the focal planes of the lenslets 10 and the sample 11 may differ where each is illuminated using different wavelengths. The two focal planes may also be offset if the lenslets 10 are not physically coplanar with the sample portion of interest. In cases of focal plane offset, once the focal adjustment distance is determined for the lenslets 10, it is added to the amount of the focal plane offset between the lenslets 10 and the sample 11, which is known or is determinable, to arrive at the appropriate focal position.

Figure 5:
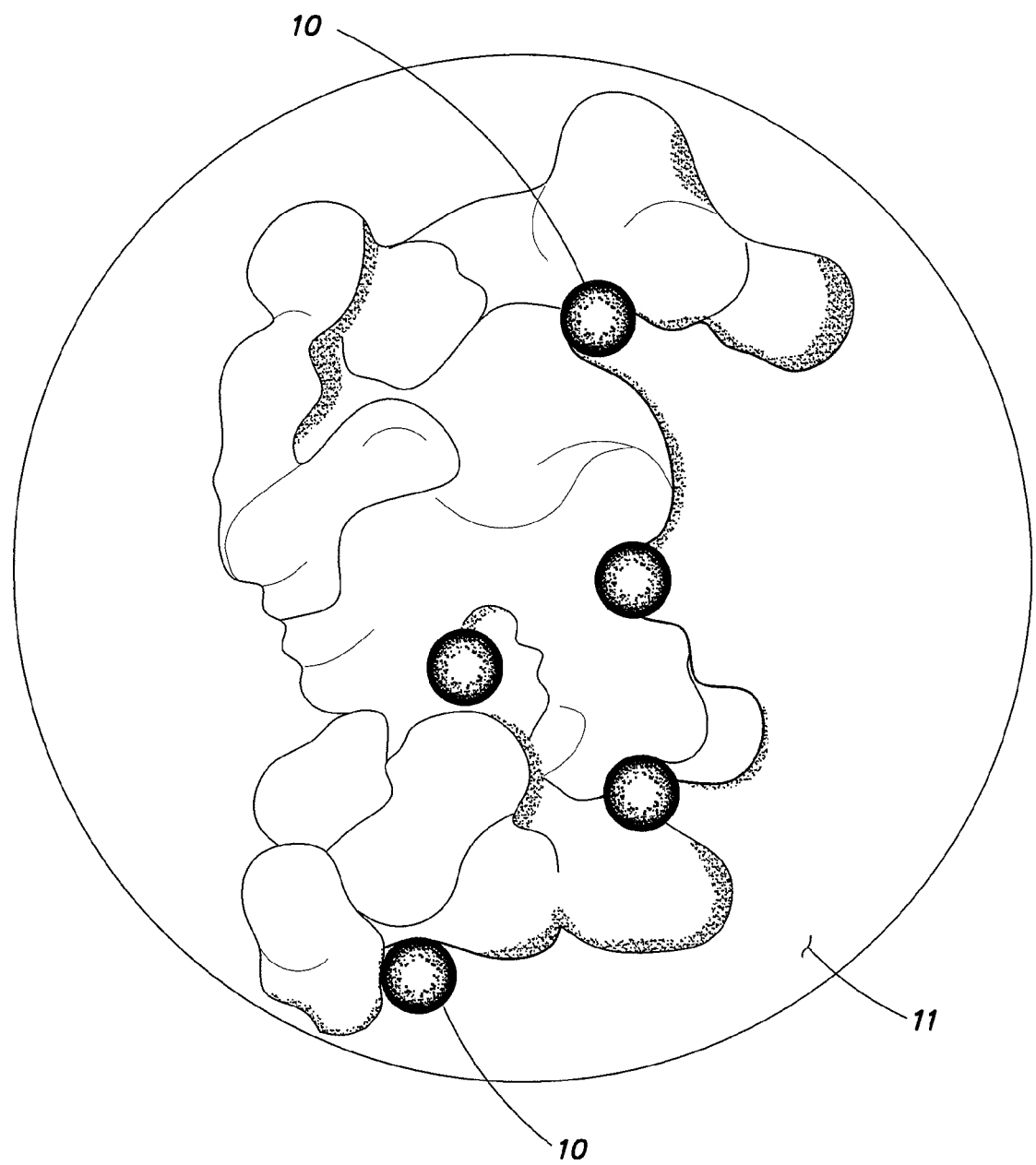
FIG. 5 is a diagrammatic magnified view of a biologic fluid sample disposed within the chamber of the container shown in FIG. 4.

The lenslets 10 and the sample 11 are illuminated at one or more wavelengths that are not appreciably absorbed by either the lenslets 10 or the sample 11. As an example, light produced at wavelengths of about 620 nm or greater will not be appreciably absorbed by a sample 11 of substantially undiluted whole blood or by four micron (4 μm) spherical lenslets 10 consisting of polystyrene. Light at other wavelengths can be used for alternative analyses, and the present invention is not limited to using any particular wavelength. An image of the light transmittance intensity is captured using a digital image dissector 24, such as a CCD or CMOS camera. The light transmittance intensity of the sample 11 is determined for the imaged sample 11 on a per unit basis, and an average value light transmittance intensity value for the sample 11 is determined. Although it is not a requirement that light transmittance intensity values be determined for the entire area of the sample 11, it is preferable since doing so typically provides a more complete analysis of the sample and a concomitant increase in accuracy. The digital image is analyzed using conventional image processing techniques to locate the lenslets 10, which appear as dark objects within the image. Depending upon where the focal plane of the imaging device 12 is initially located, the centers of the lenslets 10 may appear light relative to the other portions of the lenslets 10. FIG. 5 shows spherical lenslets 10 that appear circular, with lighter colored central regions.

To facilitate the image analysis, the image can be segmented and only those objects having a relative average light transmittance value below a predetermined cutoff value (e.g., 0.90) are then selected for analysis. FIG. 7 shows, for example, a characteristic light transmittance intensity pattern segmented to define different intensity quadrants having different regional characteristics (e.g., off-peak low, target range, off-peak high). Alternative and/or additional cutoff criteria can also be used to decrease the amount of analysis required; e.g., area corresponding to about that of a lenslet 10. These cutoff values can be chosen through trial and error to increase the accuracy and speed of the analysis. The selected objects are then collectively further analyzed to determine the light transmittance intensity values at particular points on the objects, which objects are the lenslets 10. As indicated above, the light transmittance intensity is determined on a per unit basis (e.g., per pixel basis) within the image. Consequently, the image of a lenslet 10 is represented by some number of pixels depending upon the size of the lenslet 10 and the magnification factor of the imaging device 12 (e.g., a spherical lenslet 10 that is four microns (4 μm) in diameter, imaged using a magnification of 0.5 microns per pixel, will have a diameter represented by about eight (8) pixels). The light transmittance values at each point are averaged. The physical uniformity of the lenslets 10 and the averaging of the intensity values increase the reliability of the intensity values.

The existing focal position of the imaging device 12 is determinable using the predetermined characteristic light transmittance pattern of the lenslets 10, the average light transmittance intensity values of at least one region within the lenslet 10 images, and the average light transmittance intensity values of the sample 11.

The predetermined characteristic light transmittance intensity pattern for a lenslet 10 is repeatable and consistent for a given type of lenslet 10. The pattern, which is stored within the imaging device 12, is a function of relative light transmittance intensity values of the different regions of the lenslet 10, relative to each other, and relative to the average light transmittance intensity of the sample 11. The pattern shown in FIGS. 6 and 7, for example, is graphical representative of a pattern for a four micron (4 μm) diameter lenslet. The vertical axis of each graph is the average intensity of a region of interest within the lenslet 10 relative to the average light transmittance intensity of the sample 11. The horizontal axis of each graph is the relative focal position.

The characteristic light transmittance intensity pattern shown in FIGS. 6 and 7 includes a first data line 36 depicting an average value for a lenslet region having a high intensity value, a second data line 38 depicting an average value for a lenslet region having a low intensity value, a third data line 40 depicting an average intensity value for all of the regions of the lenslet 10, a fourth data line 42 depicting an average value for a region adjacent, but outside the lenslet 10, and a fifth data line 44 depicting an average intensity value for the center region of the lenslet, all of which lines are depicted as a function of focal position. The positions of these data lines relative to one another are a repeatable, consistent characteristic of the lenslet. Because these data lines are created as a function of relative light transmittance intensity (e.g., relative to each other and relative to the average intensity of the sample 11), the present method is insensitive to the actual exposure or image light intensity, and is operable so long as there is sufficient signal available for analysis.

Of particular note is the light transmittance intensity values at the center of the lenslet, which vary cyclically from a maximum to a minimum; i.e., an "S" type plot. The maximum to minimum intensity values for the center region of the spherical lenslet 10 occur within a focal distance corresponding to two lenslet diameters; e.g., for a four micron (4 μm) diameter lenslet, the peak-to-valley intensity spread is about eight microns (8 μm). This curve is highly reproducible, and the relative light transmittance intensity in the middle of the curve is used as a target value for an optimum focal position. The middle of the "S" shaped curve for the center region is used as a target value because it resides in a relatively linear, constant slope portion of the curve, which provides desirable focal position sensitivity. The data collected for the center regions of the lenslets 10 also has a higher degree of reliability than other regions. In the pattern shown in FIGS. 6 and 7, the middle of the "S" shaped curve for the center region is aligned with a value of about 0.75 on the Y-axis; i.e., a position where the average light transmittance intensity values of the center region is about three-quarters (0.75) of the average light transmittance intensity value of the sample 11 in relative terms. The focal position value associated with the middle of the "S" curve (i.e., at the 0.75 intersection) represents the target focal position that has been determined to provide the desired focus of the imaging device 12 relative to the lenslets 10.

The determination of the existing focal position of the imaging device 12 is made by locating on a curve within the characteristic pattern (e.g., the center region curve, etc.) the average intensity value of at least one region within the lenslets 10 relative to the average intensity value for the sample 11 (e.g. the y-axis value) and finding the corresponding existing focal position value (i.e., the x-axis value). The offset between the existing focal position and the target focal position (i.e., the position of optimum focus) represents the adjustment necessary to bring the imaging device 12 to the target focal position.

In certain portions of the lenslet characteristic pattern, the curves can be intersected at more than one point by a horizontal line extending from the y-axis. In such cases, more than one existing focal position may be associated with a relative intensity value. To determine the correct existing focal position, another data point from the characteristic pattern is determined. This data can be collected from the existing image or a subsequent image. For example, the average intensity value from a high value region on the lenslets 10 divided by the average sample intensity value (e.g. the y-axis value) can be plotted on the high value curve within the pattern. Once the position on the high value curve is determined, the associated existing focal position value can be determined from the x-axis. The existing focal position value from the high curve will agree with one of the focal positions determined off of the center region curve, thereby confirming one of the focal positions as the correct existing focal position. The same process can be performed relative to another curve within the pattern to provide additional confirming data, if desired. Once the existing focal position is confirmed, the offset between the existing focal position and the target focal position can be determined, which offset represents the adjustment necessary to bring the imaging device 12 to the target focal position.

It should be noted that the correct existing focal position (and therefore the offset to the optimum focus) can be determined using any of the curves plotted within the characteristic pattern. As stated above, however, the center region curve offers advantages relative to sensitivity and reliability. Consequently, the accuracy of the process is enhanced by using the center region curve for at least one of the data points used to establish the existing focal position.

In some instances, the relative intensity value determined for the characteristic pattern may be aligned with curve portions (e.g., substantially horizontal segments) that can be associated with a plurality of focal positions on the y-axis. In those instances, the above methodology is performed and one of the potential existing focal positions is chosen. The methodology is then be repeated with a new image and adjustments made to the focal position if necessary.

In the event the original focal position of the imaging portion of the analytical device is so far off that intensity values determined from that position yield data outside the characteristic pattern for that lenslet, the imaging portion of the analysis device can be first brought into approximate focus by a conventional technique such as maximizing contrast.

Although this invention has been shown and described with respect to the detailed embodiments thereof, it will be understood by those skilled in the art that various changes in form and detail may be made without departing from the spirit and scope of the invention. For example, the characteristic light transmittance intensity pattern for the lenslets 10 is described above within the Detailed Description portion in a graphical form. The pattern is not limited to a graphical expression, and can take the form of mathematical expressions describing the relative light transmittance curves, or could be in the form of a data table, etc. As another example, the above detailed embodiments discuss the invention in terms of a biologic sample 11 being disposed within an independent chamber 17. In alternative embodiments, the imaging device 12 may incorporate sample handling hardware. As another example, the characteristic light transmittance patterns are described in terms of average light transmittance values. In alternative embodiments, useful information may be accessed using data from single lenslets 10, or by statistical information other than average values.

What is claimed is:

1. A method for determining a focal position of an imaging device adapted to image a: biologic sample, which sample has a refractive index, comprising the steps of:
    disposing lenslets relative to a field of a biologic sample such that the lenslets are substantially positionally fixed relative to the sample, which lenslets have a height, and have a refractive index and which refractive index is different from that of the sample;
    wherein one or both of the imaging device and the lenslets are relatively locatable so the focal position of the imaging device can be moved along the height of the lenslets;
    imaging at least the field of the sample and a plurality of the lenslets using transmittance at one or more predetermined wavelengths;
    determining a representative light transmittance intensity of the sample field at the wavelengths;
    determining a representative light transmittance intensity of at least one region of the lenslets at the wavelengths; and
    determining the focal position of the imaging device using the representative light transmittance intensity of the sample field and the representative light transmittance intensity of the region of the lenslets.

2. The method of claim 1, wherein the step of determining the focal position further includes using a characteristic light transmittance intensity pattern for the lenslets.

3. The method of claim 2, wherein the characteristic light transmittance intensity pattern for the lenslets is graphically expressed.

4. The method of claim 2, wherein the characteristic light transmittance intensity pattern for the lenslets is mathematically expressed.

5. The method of claim 2, wherein the characteristic light transmittance intensity pattern for the lenslets is disposed within a look-up table.

6. The method of claim 2, wherein the representative light transmittance intensity of the sample field is an average light transmittance intensity, and the representative light transmittance intensity of at least one region of the lenslets is an average light transmittance intensity of the at least one region of the lenslets.

7. The method of claim 6, wherein the lenslets are disposed within the field of the biologic sample.

8. The method of claim 7, wherein the lenslets are disposed within the sample.

9. The method of claim 2, wherein the characteristic light transmittance intensity pattern for the lenslets represents a light transmittance intensity value for at least one region of the lenslets relative to a light transmittance intensity value for the sample as a function of the focal position of the imaging device relative to the lenslets.

10. The method of claim 2, wherein the characteristic light transmittance intensity pattern for the lenslets represents an average light transmittance intensity value for at least one region of the lenslets relative to an average light transmittance intensity value for the sample as a function of the focal position of the imaging device relative to the lenslets.

11. The method of claim 2, further comprising the step of determining an offset between the determined focal position of the imaging device and a target focal position of the imaging device.

12. The method of claim 2, wherein the lenslets are all substantially the same shape.

13. The method of claim 12, wherein the lenslets are spherical.

14. The method of claim 13, wherein the at least one region of the lenslets is a center region of the lenslets.

15. The method of claim 14, further comprising the steps of:
   determining a target focal position using the determined light transmittance intensity of the center region of the lenslets; and
   determining an offset between the determined focal position of the imaging device and a target focal position of the imaging device.

16. The method of claim 2, wherein the step of determining the representative light transmittance intensity of at least one region of the lenslets comprises determining the representative light transmittance intensities of a first region of the lenslets and a second region of the lenslets at the wavelengths; and
   wherein the step of determining the focal position of the imaging device uses the representative light transmittance intensity of the sample field and the representative light transmittance intensities of the first region of the lenslets and the second region of the lenslets.

17. The method of claim 2, wherein the imaging step is performed using one or more predetermined wavelengths that are substantially not absorbed by both the sample and the lenslets.

18. The method of claim 2, wherein substantially the entire field is imaged in the step of imaging, and the representative light transmittance intensity of the sample field is an average of the light transmittance intensity of substantially the entire sample at the wavelengths.

19. The method of claim 2, wherein the lenslets and the sample are disposed in the same focal plane.

20. The method of claim 2, wherein the lenslets are in a first focal plane, and the sample is in a second focal plane different from the first focal plane, further including the step of determining an offset between the first and second focal planes.

21. An apparatus for imaging a biologic sample, which sample has a refractive index, comprising:
   a chamber formed between a first panel and a second panel, which panels are transparent, and which chamber is operable to quiescently hold the sample;
   a plurality of lenslets disposed within the chamber, which lenslets have a height and a refractive index, which refractive index is different from that of the sample;
   a field illuminator for selectively illuminating at least a field of the sample and the lenslets;
   an image dissector for convening an image of light passing through the field of the sample and the lenslets into an electronic data format;
   a positioner operable to selectively change the relative position of one or more of the chamber containing the lenslets, the field illuminator, and the image dissector to selectively change a focal position of the apparatus along the height of the lenslets; and
   a programmable analyzer adapted to cooperate with the field illuminator and the image dissector to image at least the field of the sample and a plurality of the lenslets using transmittance at one or more predetermined wavelengths, and to determine a representative light transmittance intensity of the sample field at the wavelengths, and to determine a representative light transmittance intensity of at least one region of the lenslets at the wavelengths, and to determine the focal position of the apparatus using the representative light transmittance intensity of the sample field and the representative light transmittance intensity of the region of the lenslets.

22. The apparatus of claim 21, wherein a characteristic light transmittance intensity pattern for the lenslets is stored within the programmable analyzer.

23. The apparatus of claim 22, wherein the characteristic light transmittance intensity pattern for the lenslets is stored as a mathematical expression.

24. The apparatus of claim 21, wherein the lenslets are all substantially the same shape.

25. The apparatus of claim 24, wherein the lenslets are spherical.

26. The apparatus of claim 24, wherein the first panel has an interior surface, and the second panel has an interior surface, and substantially all of the lenslets contact both interior surfaces.

27. The apparatus of claim 21, wherein the field illuminator is operable to illuminate the sample and the lenslets along one or more wavelengths that are substantially not absorbed by both the sample and the lenslets.

28. The apparatus of claim 21, wherein the lenslets and the sample are disposed in the same focal plane.

* * * * *